United States Patent [19]

Foreman

[11] Patent Number: 5,483,842
[45] Date of Patent: Jan. 16, 1996

[54] FORCE SENSOR USING A PIEZOCERAMIC DEVICE

[75] Inventor: Donald S. Foreman, Fridley, Minn.

[73] Assignee: Honeywell Inc., Minneapolis, Minn.

[21] Appl. No.: 347,009

[22] Filed: Nov. 30, 1994

[51] Int. Cl.$^6$ .................................................. G01L 1/00
[52] U.S. Cl. ........................................ 73/862.392; 73/581
[58] Field of Search ................................ 73/35 P, 35 I, 73/35 M, 35 O, 35 KS, 35 K, 35 KR, 581, 862.392, 862.393, DIG. 4

[56] References Cited

U.S. PATENT DOCUMENTS

| 3,269,175 | 8/1966 | Sprosty | 73/DIG. 4 |
|---|---|---|---|
| 4,225,802 | 9/1980 | Suzuki et al. | 73/35 P |
| 4,371,804 | 2/1983 | Peng et al. | 73/35 P |
| 4,393,688 | 7/1983 | Johnston et al. | 73/35 P |
| 4,483,480 | 11/1984 | Yashuhara | 73/DIG. 4 |
| 4,727,279 | 2/1988 | Peng | 73/35 P |
| 5,142,914 | 9/1992 | Kasakabe et al. | 73/DIG. 4 |

Primary Examiner—Richard Chilcot
Assistant Examiner—Ronald Biegel
Attorney, Agent, or Firm—William D. Lanyi

[57] ABSTRACT

A force sensor is provided which incorporates a piezoceramic element between first and second members that are moveable relative to each. The piezoceramic element is disposed within a cavity that is formed in the first member. The cavity extends between an opening and a wall within the first member. A second member is disposed within the cavity and slideably associated therewith. A spring is provided to permit the piezoceramic element to be preloaded without damaging it. First and second conductive elements are disposed on opposite sides of the piezoceramic element to facilitate electrical connection between the piezoceramic element and an external device.

10 Claims, 5 Drawing Sheets

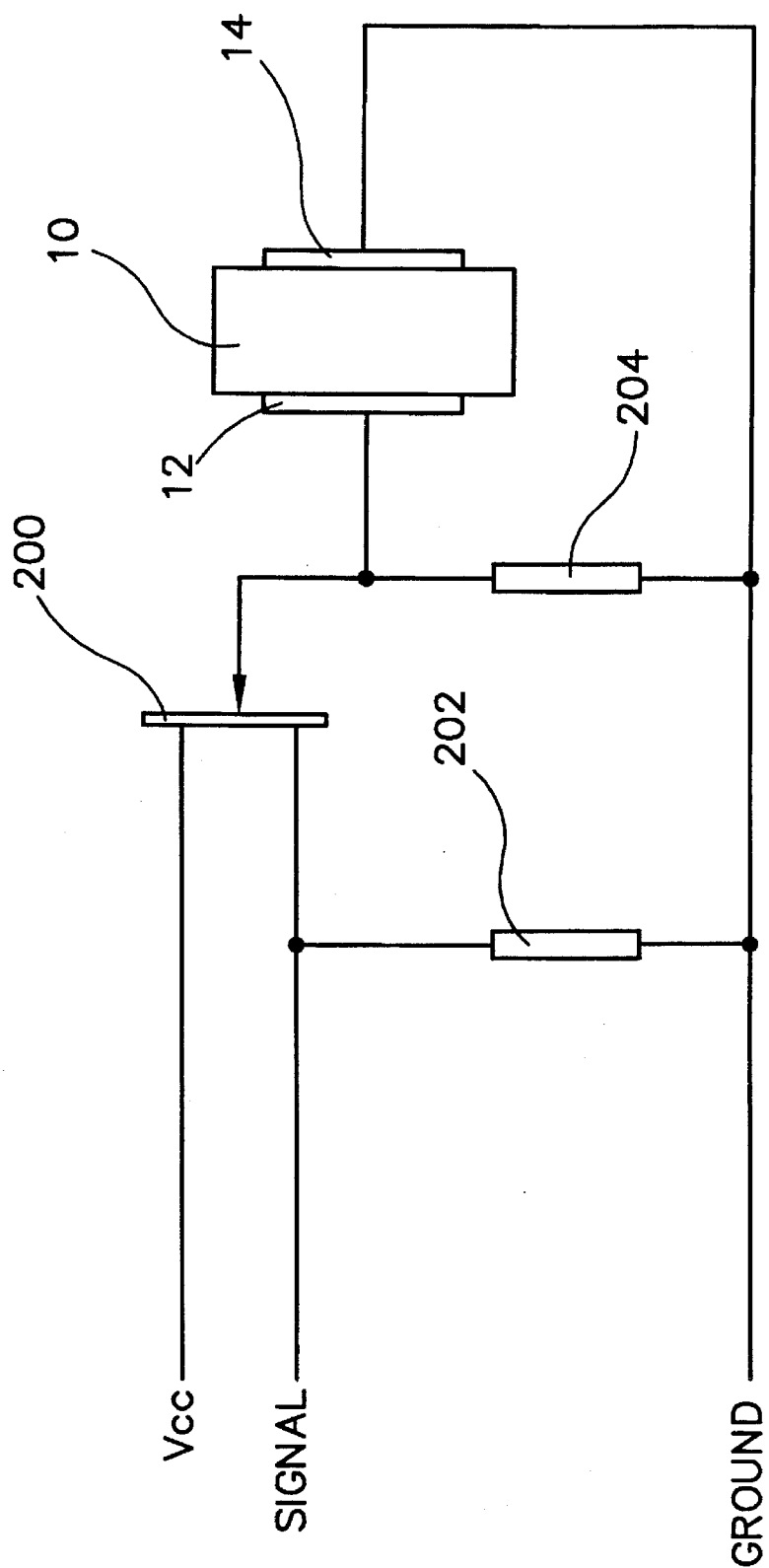

FORCE SENSOR USING A PIEZOCERAMIC DEVICE

BACKGROUND OF THE INVENTION

1. Field of the Invention

The present invention relates generally to force sensors and, more particularly, to a force sensor that disposes a piezoelectric component between a wall within a cavity formed in a first member and a second member disposed within the cavity and slideably associated therewith.

2. Description of the Prior Art

Piezoelectricity is the phenomenon in which certain crystalline substances develop an electric field when subjected to pressure forces or, conversely, exhibit a mechanical deformation when subjected to an electric field. The piezoelectric affect is found only in crystals which have no center of symmetry. Examples include quartz, Rochelle salt and many synthetic polycrystalline ceramics. In the manufacture of piezoceramics, a suitable dielectric material (e.g. barium titanate or lead zirconate titanate) is first fabricated into a desired shape and then electrodes are applied to it. The piezoceramic element is then heated to an elevated temperature and subsequently cooled while in the presence of a strong direct current electric field. This process polarizes the ceramic by aligning the molecular dipoles of the ceramic in the direction of the applied field. It therefore provides it with its piezoelectric properties.

It is well known to those skilled in the art to use a piezoelectric component, such as piezoceramic, for the purpose of providing an accelerometer. In applications of this type, a weight or proof mass is attached to one side of a piezoelectric component and, as the device is subjected to acceleration, the proof mass exerts a force on the piezoelectric component and affects a preselected dimension of the piezoelectric component to either increase or decrease that dimension. In addition, since ceramics are generally much stronger in compression then in tension, they are preloaded to assure that the ceramic component is always in compression. This avoids potential damage to the piezoceramic element. As a result, strain is induced in the piezoelectric component and an electrical signal is provided that is generally representative of the acceleration exerted on the device.

SUMMARY OF THE INVENTION

The present invention uses a piezoelectric component to measure changes in force. In order to provide a means for measuring force in an accurate manner, it is sometimes necessary to preload the piezoelectric component with a predetermined magnitude of force. By preloading the component, accurate changes in force can be measured in both directions from an initial reference value.

A preferred embodiment of the present invention provides a force sensor that comprises a first member having a first cavity formed therein. The first cavity has an opening at one end and a wall at the other end. A second member is disposed in moveable association with the first member within the first cavity. A piezoelectric component is disposed within the first cavity and a resilient force transfer device is disposed within the first cavity between the wall and the piezoelectric component. A means is provided for measuring a voltage potential between a first portion, or surface, of the piezoelectric component and a second portion, or surface, of the piezoelectric component.

In a particularly preferred embodiment of the present invention, the resilient force transfer device is a spring and the piezoelectric component is a piezoceramic component. In certain embodiments of the present invention, the second member is made of an electrically conductive material and a means is provided for insulating the second member from the piezoelectric component. The force sensor of the present invention can be attached to a machine for washing articles for the purpose of measuring forces on a rotatable shaft that supports a drum.

In a preferred embodiment of the present invention, a first conductive element is disposed on a first side of the piezoelectric component between the piezoelectric component and the wall at one end of the cavity. A second conductive element is disposed on a second side of the piezoelectric component between the piezoelectric component and the second member. A hole can be formed through the first conductive element and through the piezoelectric component in order to facilitate the connection of an electrical conductor to each side of the piezoelectric element.

BRIEF DESCRIPTION OF THE DRAWINGS

The present invention will be more fully and completely understood from a reading of the Description of the Preferred Embodiment in conjunction with the drawings, in which:

FIG. 6 illustrates a circuit which provides a low impedance output signal from the force sensor.

DESCRIPTION OF THE PREFERRED EMBODIMENT

Figure 2:
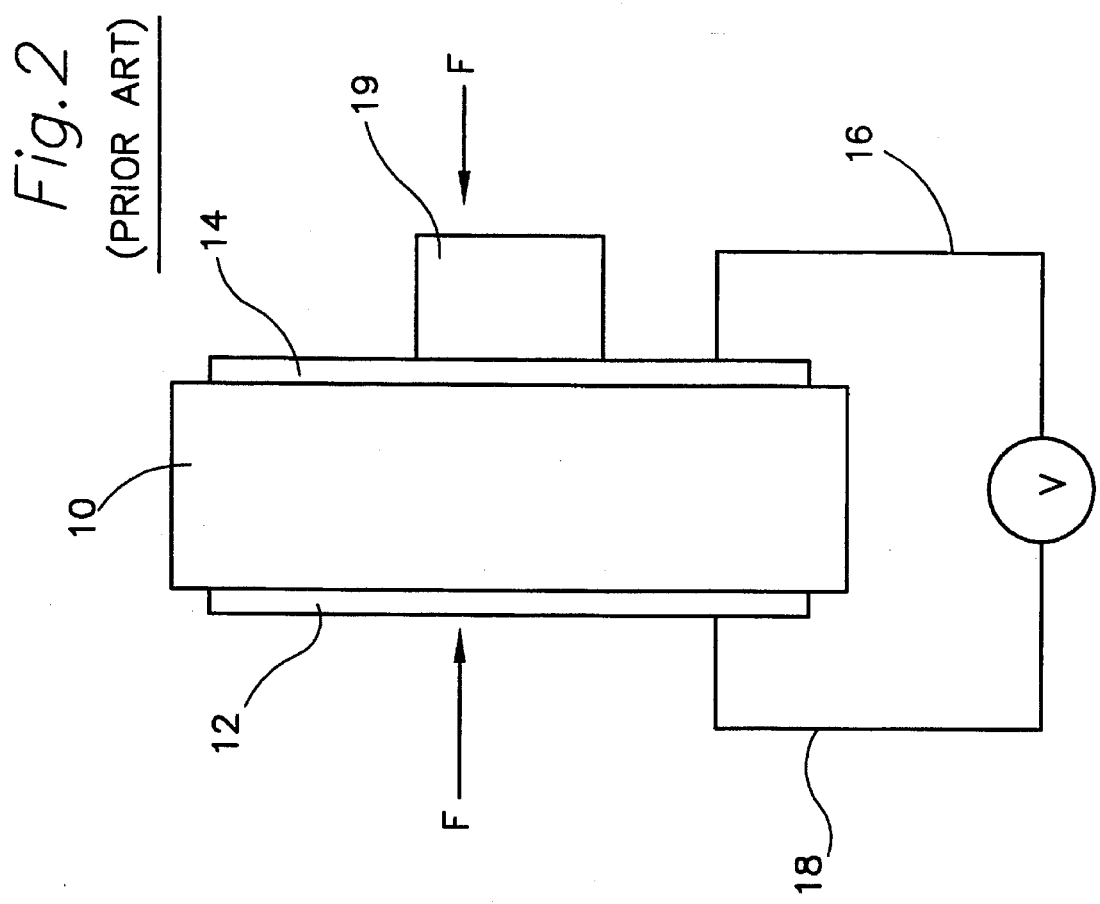
FIG. 2 is a side view of the piezoceramic element of FIG. 1.
Figure 1:
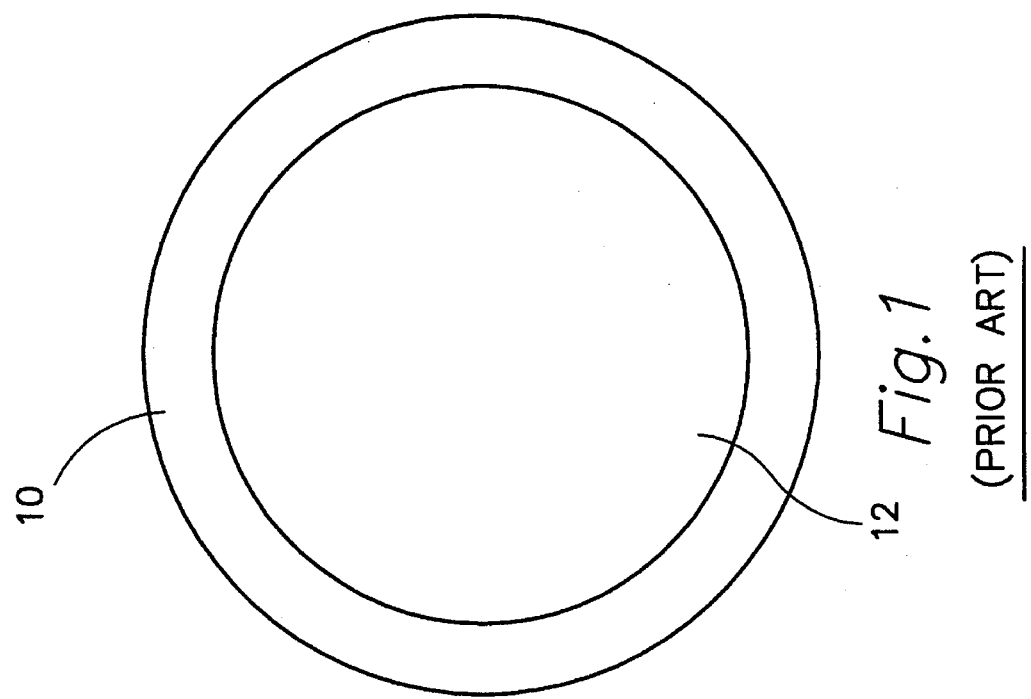
FIG. 1 is a top view of a piezoceramic element.

Throughout the Description of the Preferred Embodiment of the present invention, like components will be identified by like reference numerals. FIG. 1 shows a piezoceramic element 10 which has an electrically conductive material 12 disposed on its visible surface in FIG. 1. As shown in FIG. 2, another layer of electrically conductive material 14 is provided on the opposite surface of the piezoceramic element 10. As is generally known to those skilled in the art, a compressive force F will result in a change in voltage potential V that can be sensed by an arrangement shown in FIG. 2. In other words, when the piezoceramic element 10 is placed under either a compressive strain or a tensile strain because of movement of the proof mass 19, a change in voltage potential between its opposite sides can be sensed. An arrangement which connects lines 16 and 18 to a means for sensing the voltage potential can be used to detect changes in the strain exerted on the device. Although a compressive strain is illustrated in FIG. 2, it should be understood that a reversal of forces, due to a reversal in acceleration A, could also be detected.

Figure 3:
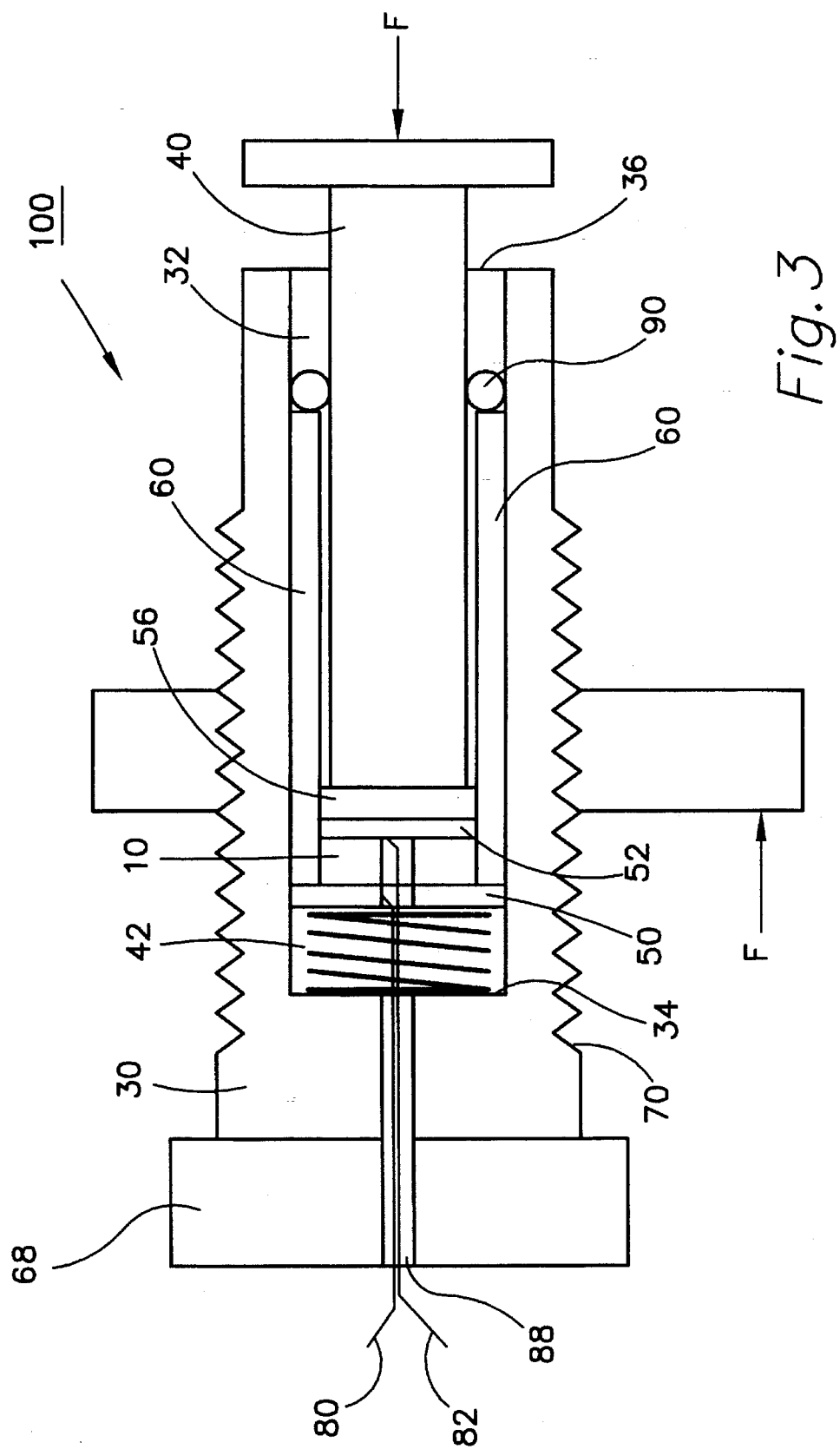
FIG. 3 is a sectional view of the present invention.

FIG. 3 shows a preferred embodiment of the present invention which comprises a first member 30 that has a cavity 32 formed therein. The cavity 32 has a wall 34 at one end and an opening 36 at the other end. A second member 40 is slideably disposed within the cavity 32. Although the second member 40 is described as being slideably disposed within the cavity 32, it should be understood that only a very slight relative movement between the first and second members is anticipated. The very slight movement of the second member 40, in response to change in force F, will change the strain on a piezoceramic element 10. It should also be understood that the very slight movement of the second member 40 within cavity 32 would normally not permit the piezoceramic element 10 to be completely unloaded at any time under normal operation of the force sensor. A spring 42 is used to provide a resilient force transfer device that serves two important functions. It transfers force F from the wall 34 to the piezoceramic element 10 and, it prevents the piezoceramic element 10 from being crushed between the wall 34 and the end of the second member 40 which operates as a plunger in response to changes in force F. In order to facilitate electrical connection to the piezoceramic element, a first conductive element 50 is disposed on one side of the piezoceramic element 10 and a second conductive element 52 is disposed on a second side of the piezoceramic element 10. As can be seen, the first conductive element 50 is disposed between the piezoceramic element 10 and the wall 34. The second conductive element 52 is disposed between the piezoceramic element 10 and the second member 40. In the particular embodiment shown in FIG. 3, the spring 42 is disposed between the wall 34 and the first conductive element 50. In addition, an insulator 56 is disposed between the second conductive element 52 and the second member 40. However, if the second member 40 is not made of an electrically conductive material, the insulative member 56 is not necessary.

If the second member 40 is made of an electrically conductive material, a preferred embodiment of the present invention provides an insulative sleeve 60 that prevents electrical communication between the second member 40 and the first member 30. In a preferred embodiment of the present invention, a foot 66 is provided at one end of the second member 40 and a head 68 is attached at an opposite end of the first member 30. The foot 66 can serve as a means for abutting a device that provides force F. The head 68 can provide a means by which the first member 30 is rotated in order to threadably engage threads 70 within a threaded stationary structure. By fixing the first member 30 in rigid association with the stationary member, changes in force F will cause slight movement of the second member 40 and the resulting increase or decrease of the compression of the piezoceramic element 10.

As can be seen in FIG. 3, a hole is formed through the piezoceramic element 10 and the first conductive element 50. These holes permit wires, 80 and 82, to extend through the first member 30 and be attached in electrical communication with the first conductive element 50 and the second conductive element 52, respectively. For purposes of clarity, the thin conductive layers 12 and 14 are not shown on the sides of the piezoceramic element 10 in FIG. 3. However, it should be understood that the conductive layers are disposed in electrical contact with the first and second conductive elements. In this manner, electrical connection between wires 80 and 82 with the first and second conductive elements provides a means for measuring the change in voltage potential across the thickness of the piezoceramic element. The wires extend through a hole 88 formed in the first member 30. An O-ring 90 serves two purposes. First, it provides a means for sealing the components associated with the piezoceramic element 10 from moisture that could otherwise contaminate the portion of the cavity 32 in which the piezoceramic element is disposed. Secondly, the O-ring 90 tends to hold the second member 40 in place when it is not under the direct affects of a force F.

Figure 4:
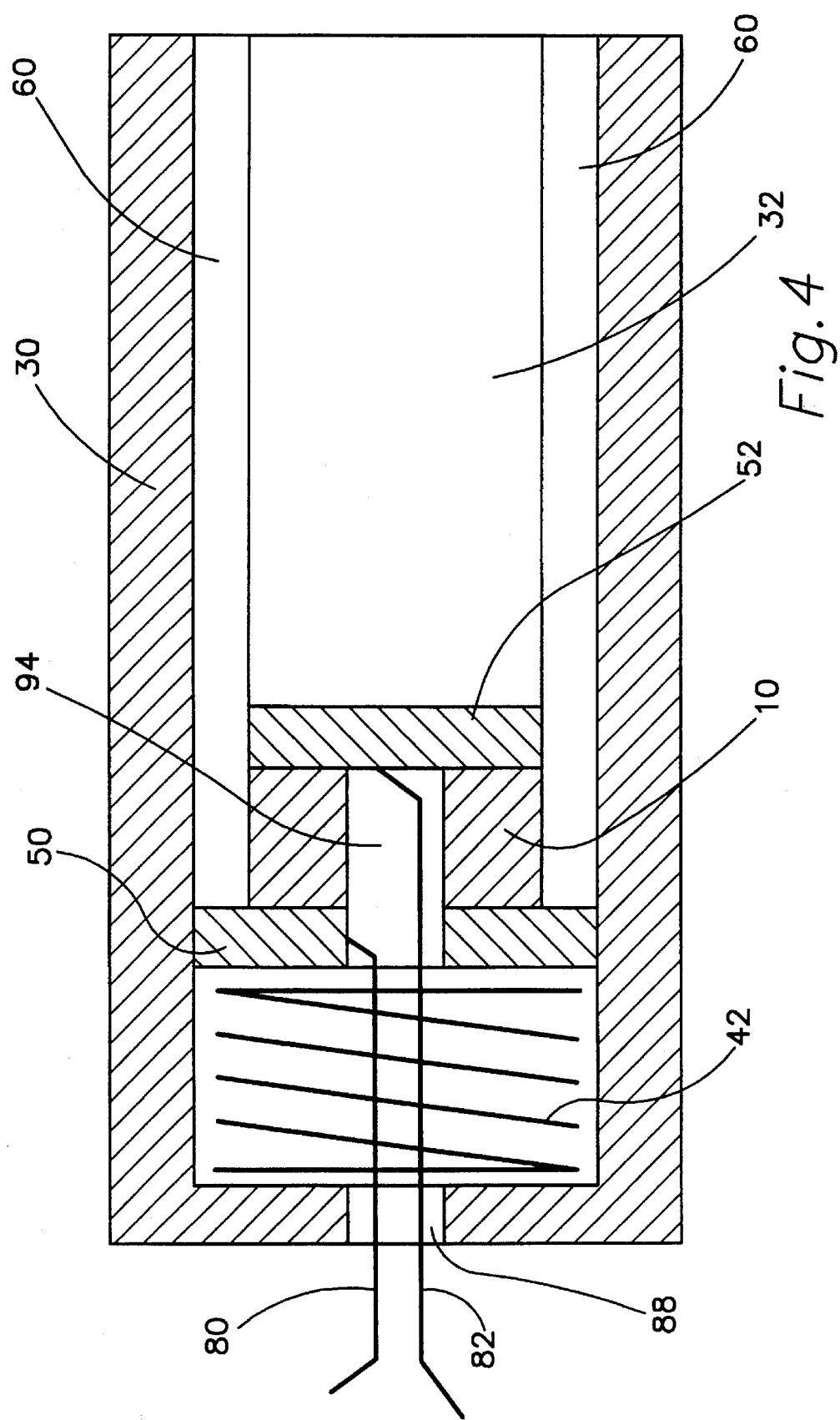
FIG. 4 is an expanded view of a portion of the device illustrated in FIG. 3.

In FIG. 4, a portion of the first member 30 is shown to illustrate the components within cavity 32 in greater detail. In FIG. 4, the second member 40 is not illustrated, but it should be understood that it would be inserted into the cavity 32 in a direction from right to left in FIG. 4. The piezoceramic element 10 is shown between the first conductive element 50 and the second conductive element 52. The hole 94 extends through the centers of the piezoceramic element 10 and the first conductive element 50. This permits wires, 80 and 82, to extend through hole 94 and be connected in electrical communication with the first conductive element 50 and the second conductive element 52 as shown in FIG. 4. The first and second conductive elements, 50 and 52, are disposed in intimate contact with the conductive layers, 12 and 14, described above in conjunction with FIG. 2. Therefore, a means can be connected in electrical communication with wires, 80 and 82, for measuring changes in the voltage potential across the thickness of the piezoceramic element 10. The insulative member 56 which is shown in FIG. 3 is not illustrated in FIG. 4. However, it should be understood that an insulative member would be disposed within the cavity 32 to insulate the second conductive element 52 from electrical communication with the second member 40 if the second member 40 is made of an electrically conductive material.

Figure 5:
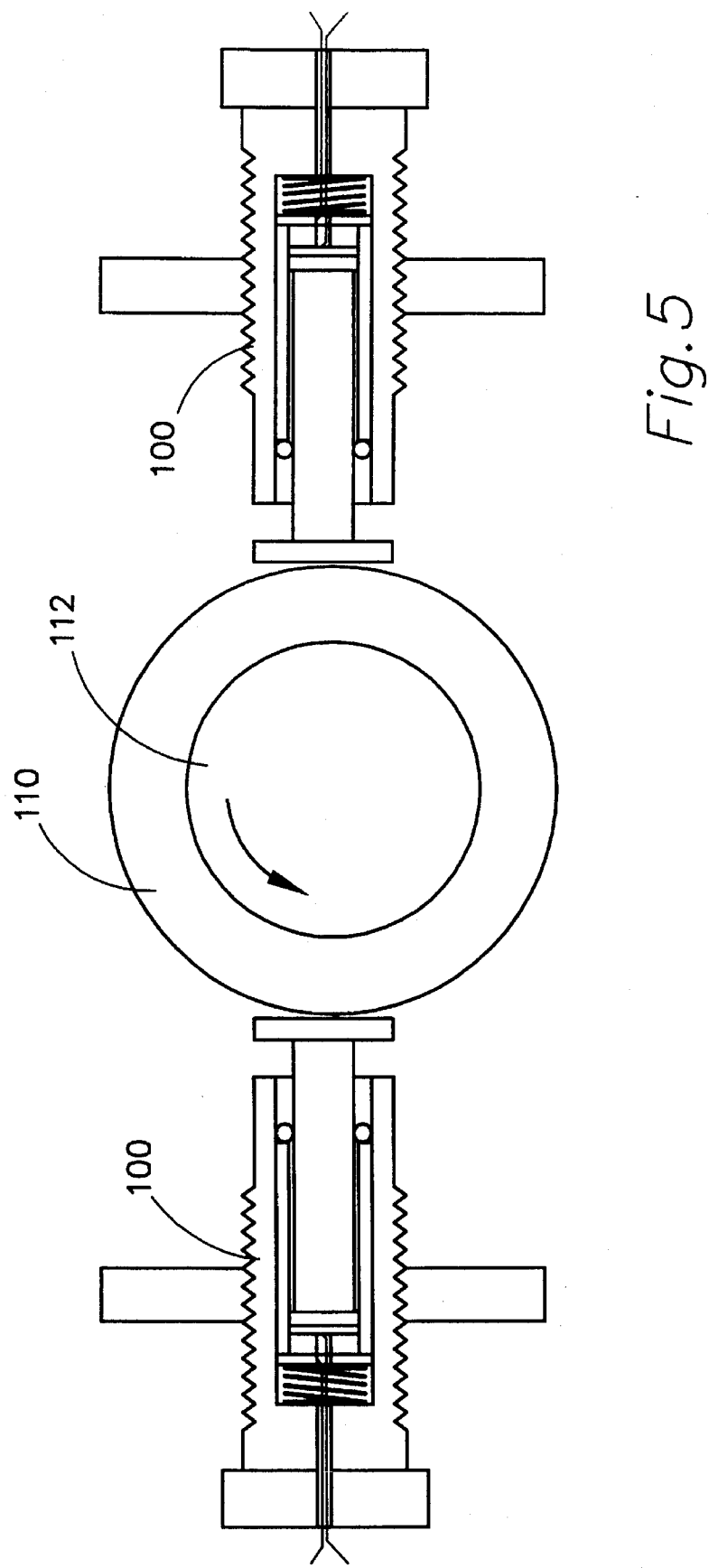
FIG. 5 shows two force sensors arranged to measure the forces on a bearing in which a rotatable shaft is supported.

FIG. 5 shows two force sensors 100 used to measure the forces on a bearing structure 110 that houses a rotatable shaft 112. It should be understood that both of the force sensors 100 shown in FIG. 5 are made in accordance with the present invention as described above in conjunction with FIG. 3. The individual components of each of the force sensors 100 illustrated in FIG. 5 are not identified by reference numerals because of their relatively small size in FIG. 5. However, it should be understood that each of the force sensors 100 comprise the identified components shown in FIG. 3 and described above. In the arrangement of FIG. 5, forces on the shaft 112 can be sensed by the two force sensors 100 and electrical signals corresponding to those forces can be transmitted to a control circuit. Alternative applications of the present invention could mount three force sensors, spaced at 120 degree intervals, around the bearing 110. It should be understood that the particular application of the present invention is not limiting to its scope.

In order to describe the utility of the present invention in more specific terms, a particular piezoceramic element will be used in a hypothetical calculation to show the relationship between the voltage signal V, as shown in FIG. 2, and a force F exerted on the piezoceramic. For purposes of this hypothetical calculation, a particular piezoceramic element which is identified as PKI-500 will be used. This particular piezoceramic element is available in commercial quantities from the PiezoKinetics Inc.. This piezoceramic provides $23.0 \times 10^{-3}$ voltmeters per newton. This PKI-500 material can be provided in a disc which is approximately 1/16th inch thick and 3/16ths inches in diameter. This results in an area on each surface of approximately $1.78 \times 10^{-5}$ meters squared. This specific material has a Young's modulus of $7.1 \times 10^{10}$ newtons per meter squared. Therefore, a one pound force would compress the piezoceramic by 0.178 microinches and would result in a voltage change across the thickness of the piezoceramic element of 0.919 volts. Therefore, it can be seen that the output of 0.919 volts per pound of force is significantly high and permits a relatively large signal to be provided on lines 80 and 82.

A force sensor made in accordance with the present invention is relatively inexpensive but provides a reliable and accurate means for measuring force against a preselected component. In addition, the present invention intensively provides larger signals than alternative force sensors. It therefore offers significant advantages over other force sensing methods, such as strain gages, which require elaborate signal amplification electronics in order to provide a useable signal. It also provides a force sensor that is relatively easy to assemble and install. The provision of the spring within the cavity prevents damage to the piezoceramic element during installation. The hole formed through the first conductive element and the piezoceramic element permits the electrical connection to be made from one end of the force sensor to both sides of the piezoceramic element.

FIG. 6 is a simplified schematic of a piezoceramic element that is associated with a semiconductive device 200 which can be either a transistor or a field effect transistor that is imbedded within the body of the sensor. Resistors, 202 and 204, are associated with the semiconductive device 200 as shown. The arrangement illustrated in FIG. 6 provides a low impedance output signal from the force sensor. It should be understood that the arrangement illustrated in FIG. 6 is not a requirement of the present invention, but provides a simple means by which a low impedance output signal can be provided.

Although the present invention has been described with considerable specificity and illustrated to show one particular embodiment it should be understood that other configurations are within its scope.

The embodiments of the invention in which an exclusive property or right is claimed are defined as follows:

1. A force sensor, comprising:

a first member having a first cavity formed therein, said first cavity having an opening at one end of said first cavity and a wall at another end of said first cavity;

a second member disposed within said first cavity of said first member, said second member being made of an electrically conductive material;

a piezoelectric component disposed within said first cavity;

a resilient force transfer device disposed within said first cavity between said wall and said piezoelectric component;

means for measuring a voltage potential between a first portion of said piezoelectric component and a second portion of said piezoelectric component; and means for insulating said second member from said piezoelectric component.

2. The sensor of claim 1, wherein:

said resilient force transfer device is a spring.

3. The sensor of claim 1, wherein:

said piezoelectric component is a piezoceramic component.

4. The sensor of claim 1, wherein:

said sensor is attached to a machine for washing articles.

5. The sensor of claim 1, further comprising:

a first conductive element disposed on a first side of said piezoelectric component between said piezoelectric component and said wall.

6. The sensor of claim 5, further comprising:

a second conductive element disposed on a second side of said piezoelectric component between said piezoelectric component and said second member.

7. A force sensor, comprising:

a first member having a first cavity formed therein, said first cavity having an opening at one end of said first cavity and a wall at another end of said first cavity;

a second member disposed within said first cavity of said first member, said second member being made of an electrically conductive material;

a piezoelectric component disposed within said first cavity, said piezoelectric component being a piezoceramic component;

a resilient force transfer device disposed within said first cavity between said wall and said piezoelectric component;

means for measuring a voltage potential between a first portion of said piezoelectric component and a second portion of said piezoelectric component, said resilient force transfer device being a spring; and means for insulating said second member from said piezoelectric component.

8. The sensor of claim 7, further comprising:

means for providing a low impedance output from said force sensor.

9. The sensor of claim 8, further comprising:

a first conductive element disposed on a first side of said piezoelectric component between said piezoelectric component and said wall; and a second conductive element disposed on a second side of said piezoelectric component between said piezoelectric component and said second member.

10. A force sensor, comprising:

a first member having a first cavity formed therein, said first cavity having an opening at one end of said first cavity and a wall at another end of said first cavity;

a second member disposed within said first cavity of said first member;

a piezoelectric component disposed within said first cavity;

a resilient force transfer device disposed within said first cavity between said wall and said piezoelectric component; and means for measuring a voltage potential between a first portion of said piezoelectric component and a second portion of said piezoelectric component, said sensor being attached to a machine for washing articles.

\* \* \* \* \*